United States Patent
Lee et al.

(10) Patent No.: US 12,359,013 B2
(45) Date of Patent: Jul. 15, 2025

(54) CURABLE COMPOSITION

(71) Applicant: LG Chem, Ltd., Seoul (KR)

(72) Inventors: Jeong Hyun Lee, Daejeon (KR); Do Yeon Kim, Daejeon (KR); Yang Gu Kang, Daejeon (KR); Shin Hee Jun, Daejeon (KR); Ha Na Lee, Daejeon (KR); Ho Yeon Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/280,608

(22) PCT Filed: Sep. 28, 2022

(86) PCT No.: PCT/KR2022/014589
§ 371 (c)(1),
(2) Date: Sep. 6, 2023

(87) PCT Pub. No.: WO2023/055087
PCT Pub. Date: Apr. 6, 2023

(65) Prior Publication Data
US 2024/0262952 A1 Aug. 8, 2024

(30) Foreign Application Priority Data
Sep. 28, 2021 (KR) .................. 10-2021-0128388
Sep. 28, 2022 (KR) .................. 10-2022-0123123

(51) Int. Cl.
| | | |
|---|---|---|
| C08G 18/42 | (2006.01) | |
| C08G 18/48 | (2006.01) | |
| C08K 3/013 | (2018.01) | |
| C08K 5/00 | (2006.01) | |
| C08K 5/053 | (2006.01) | |

(52) U.S. Cl.
CPC ..... C08G 18/4277 (2013.01); C08G 18/4862 (2013.01); C08K 3/013 (2018.01); C08K 5/0016 (2013.01); C08K 2201/001 (2013.01)

(58) Field of Classification Search
CPC ............ C08G 18/4277; C08G 18/4862; C08K 3/013; C08K 5/0016; C08K 2201/001; C08K 5/053; C09D 167/00
See application file for complete search history.

(56) References Cited

U.S. PATENT DOCUMENTS

| | | |
|---|---|---|
| 5,278,223 A | 1/1994 | Gruenewaelder et al. |
| 9,365,057 B1 | 6/2016 | Seino et al. |
| 2010/0197867 A1 | 8/2010 | Niimi et al. |
| 2011/0245406 A1 | 10/2011 | Klein et al. |
| 2013/0052469 A1 | 2/2013 | Klein et al. |
| 2013/0071340 A1 | 3/2013 | Wenk et al. |
| 2017/0204310 A1 | 7/2017 | Ostlund et al. |
| 2020/0207909 A1 | 7/2020 | Rule et al. |
| 2020/0220124 A1 * | 7/2020 | Park .................. H01M 10/482 |
| 2020/0277433 A1 | 9/2020 | Cho et al. |
| 2022/0089922 A1 * | 3/2022 | Narutaki .................. C09J 7/30 |
| 2022/0289891 A1 | 9/2022 | Yang et al. |

FOREIGN PATENT DOCUMENTS

| | | | |
|---|---|---|---|
| JP | 2010529239 A | 8/2010 | |
| JP | 2012511058 A | 5/2012 | |
| JP | 2013504633 A | 2/2013 | |
| JP | 2020172669 A | 10/2020 | |
| JP | 2020533443 A | 11/2020 | |
| JP | 6817533 B2 | 1/2021 | |
| KR | 20100037058 A | 4/2010 | |
| KR | 20160105334 A | 9/2016 | |
| KR | 20190136646 A | 12/2019 | |
| KR | 102162495 B1 | 10/2020 | |
| KR | 20210021928 A | 3/2021 | |
| KR | 20210071564 A | 6/2021 | |
| WO | WO-2020121993 A1 * | 6/2020 | ............ C08G 18/10 |

OTHER PUBLICATIONS

Extended European Search Report including Written Opinion for Application No. 22876859.4 dated Aug. 21, 2024. 11 pgs.
International Search Report for Application No. PCT/KR2022/014589 mailed Jan. 18, 2023. 4 pages.

* cited by examiner

*Primary Examiner* — Haidung D Nguyen
(74) *Attorney, Agent, or Firm* — Lerner David LLP

(57) ABSTRACT

The present application relates to a resin composition or a use thereof. In the present application, it is possible to provide a resin composition or a cured body thereof that exhibits low adhesion force to a predetermined adherend while exhibiting high thermal conductivity. Also, in the present application, the low adhesion force can be achieved without using an adhesion force adjusting component such as a plasticizer or in a state where the use ratio thereof is minimized. The present application can also provide a product comprising the curable composition or the cured body thereof.

15 Claims, 2 Drawing Sheets

[FIG.1]
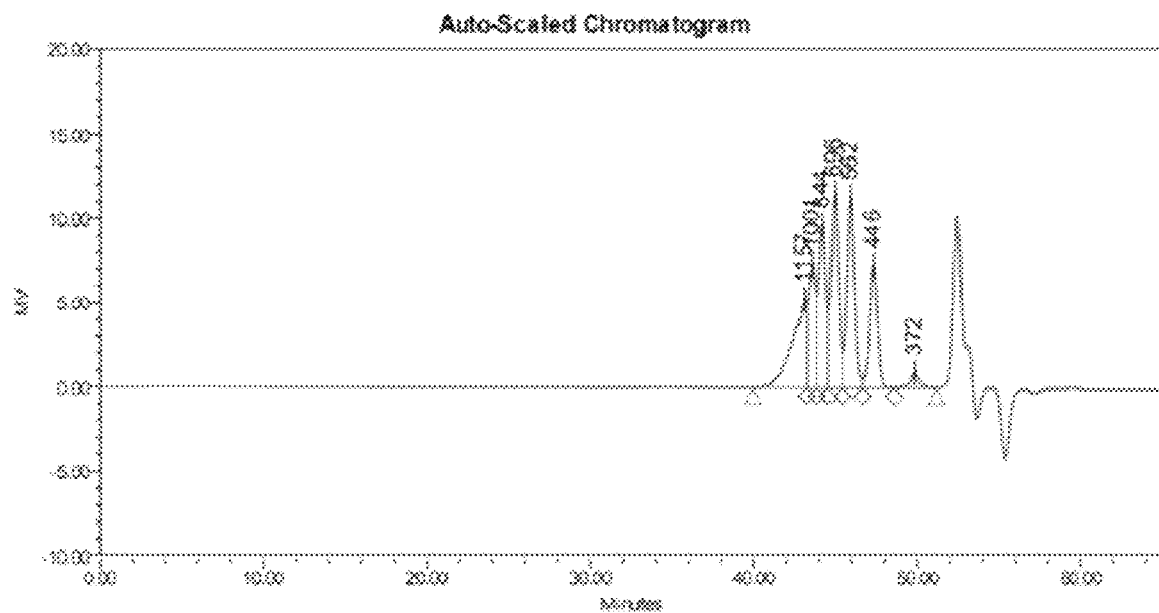
GPC Results
| | Retention Time (min) | Mn | Mw | MP | Mz | Mz+1 | Polydispersity | % Area |
|---|---|---|---|---|---|---|---|---|
| 1 | 43.108 | 1367 | 1416 | 1157 | 1480 | 1562 | 1.036374 | 16.66 |
| 2 | 43.588 | 1009 | 1012 | 1001 | 1014 | 1017 | 1002484 | 11.85 |
| 3 | 44.194 | 843 | 845 | 844 | 847 | 850 | 1.002621 | 16.44 |
| 4 | 44.949 | 695 | 697 | 696 | 698 | 700 | 1.002364 | 19.40 |
| 5 | 45.932 | 560 | 561 | 562 | 563 | 564 | 1.002103 | 20.00 |
| 6 | 47.306 | 446 | 447 | 446 | 447 | 448 | 1.001161 | 13.58 |
| 7 | 49.844 | 373 | 373 | 372 | 373 | 373 | 1.000060 | 2.07 |

[FIG.2]
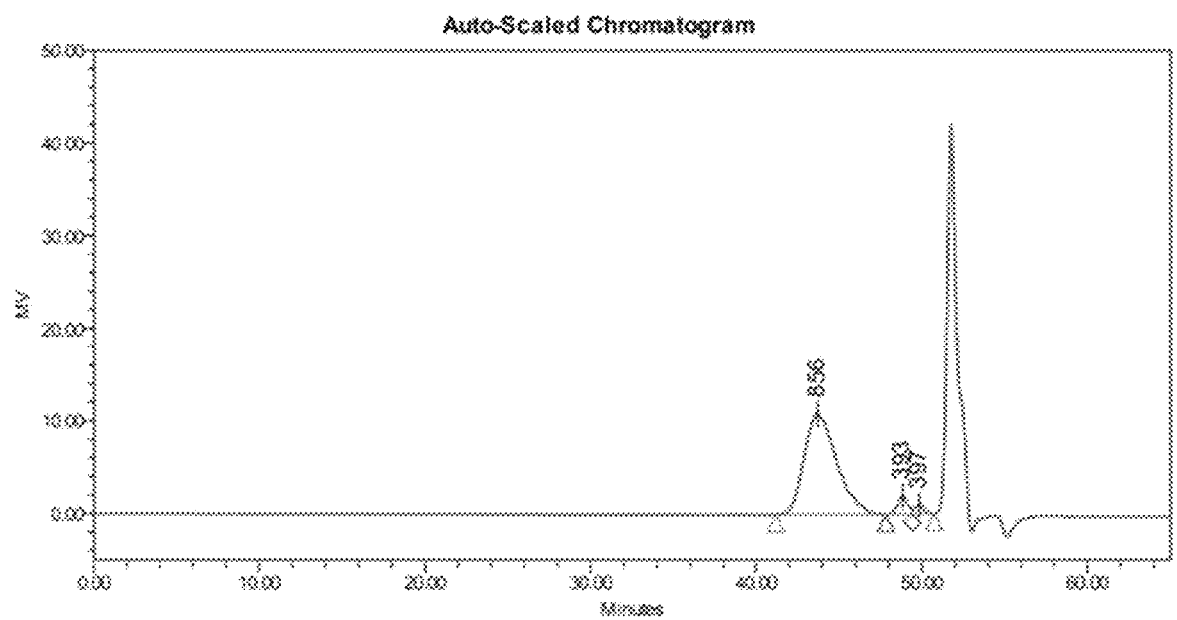

CURABLE COMPOSITION

CROSS-REFERENCE TO RELATED APPLICATIONS

This application is a national stage entry under 35 U.S.C. § 371 of International Application No. PCT/KR2022/014589 filed on Sep. 28, 2022, which claims priority from Korean Patent Applications No. 10-2021-0128388 filed on Sep. 28, 2021, and No. 10-2022-0123123 filed on Sep. 28, 2022.

TECHNICAL FIELD

The present application relates to a curable composition.

BACKGROUND ART

As the number of electric or electronic devices requiring heat management, such as batteries, increases, the importance of heat dissipation materials increases.

Various types of heat dissipation materials are known. As one of the conventional heat dissipation materials, a material in which a resin binder is filled with a filler having heat dissipation properties is known (for example, Patent Document 1).

In such a heat dissipation material, a silicone resin, a polyolefin resin, an acrylic resin, or an epoxy resin, and the like is usually used as the resin binder.

The heat dissipation material is basically required to have an excellent thermal conductivity, and required to have additional functions as well depending on the use. For example, depending on the use, the heat dissipation material may be required to exhibit low adhesion force to a specific adherend together with the high thermal conductivity.

For example, when it is necessary to replace a part in contact with a heat dissipation material in a product, or necessary to change a location or the like of a heat dissipation material in a process, the heat dissipation material needs to exhibit low adhesion force.

Among known heat dissipation materials, materials showing low adhesion force include materials to which a silicone resin is applied as the resin binder. However, the silicone resin is relatively expensive. In addition, the silicone resin comprises components that cause contact failure and the like when applied to electronic/electrical products, so that the uses are limited.

The polyurethane material applied even in Patent Document 1 can form a heat dissipation material having high thermal conductivity, and has various other advantages, but is a material exhibiting high adhesion force to most adherends.

A method of lowering adhesion force of a material exhibiting high adhesion force includes a method of blending a component known as a so-called plasticizer. However, the plasticizer formulated in a large amount for control of adhesion force has a problem of damaging the inherent merits of the material itself or being eluted during a use process, and the like.

PRIOR ART DOCUMENTS (Patent Document 1) Korean Laid-Open Patent Publication No. 2016-0105354

Technical Problem

The present application is intended to provide a curable composition. It is one object of the present application that the curable composition or the cured body thereof exhibits low adhesion force to a predetermined adherend while exhibiting high thermal conductivity. Also, in the object of the present application, the matter of achieving the low adhesion force without using an adhesion force adjusting component such as a plasticizer or in a state where the use ratio thereof is minimized.

It is one object of the present application to provide a product comprising the curable composition or the cured body thereof.

Technical Solution

Among the physical properties mentioned in this specification, when the measurement temperature affects the result, the relevant physical property is a physical property measured at room temperature, unless otherwise specified. The term room temperature is a natural temperature without warming or cooling, which means usually one temperature in a range of about 10° C. to 30° C. or a temperature of about 23° C. or about 25° C. or so. Also, in this specification, unless otherwise specified, the unit of temperature is ° C.

Among the physical properties mentioned in this specification, when the measurement pressure affects the result, the relevant physical property is a physical property measured at normal pressure, unless otherwise specified. The term normal pressure is a natural pressure without pressurization or depressurization, which refers to an atmospheric pressure in a range of about 700 mmHg to 800 mmHg or so as the normal pressure.

The present application relates to a resin composition. The term resin composition means a composition comprising a component known in the art as a resin, or a composition that does not comprise a resin, but comprises a component capable of forming a resin through a curing reaction or the like.

Therefore, in this specification, the scope of the term resin or resin component includes not only components generally known as resins, but also components capable of forming resins through curing and/or polymerization reactions.

The resin composition may be a curable composition.

When the resin composition of the present application is a curable composition, the resin composition may be a one-component or two-component resin composition. The term one-component resin composition may mean a resin composition in which components participating in curing are included in a state where they are in physical contact with each other, and the term two-component resin composition may mean a resin composition in which at least some of components participating in curing are physically separated to be divided, and included.

When the resin composition of the present application is a curable composition, the resin composition may be a room temperature curing type, a heat curing type, an energy ray curing type, and/or a moisture curing type. The term room temperature curing type refers to a resin composition that a curing reaction can be initiated and/or proceed at room temperature; the term heat curing type refers to a resin composition that a curing reaction can be initiated and/or proceed by application of heat; the term energy ray curing type refers to a resin composition that a curing reaction can be initiated and/or proceed by irradiation with energy rays (e.g., ultraviolet rays or electron beams, etc.); and the term moisture curing type refers to a resin composition that a curing reaction can be initiated and/or proceed in the presence of moisture.

The resin composition of the present application may be a solvent type or a solventless type. The solventless type may be appropriate when considering an application efficiency aspect or the load to the environment, and the like.

The resin composition of the present application may be a polyurethane composition. In this case, the resin composition may comprise polyurethane, or may comprise a component capable of forming polyurethane.

The resin composition of the present application may exhibit low adhesion force with respect to a specific adherend or form a cured body capable of exhibiting low adhesion force. The resin composition of this application may be a polyurethane composition. The polyurethane is known as an adhesive material capable of exhibiting excellent adhesion to various adherends. Therefore, as a method of making the polyurethane composition exhibiting low adhesion force to an adherend, a method of introducing a component that lowers the adhesion force, such as a plasticizer, is usually used. When components of such a plasticizer and the like are applied, it is possible to lower the adhesion force of the polyurethane material, but there may be a problem that the relevant component deteriorates other physical properties which could be secured in the polyurethane, or it elutes out of the material during the use process of the polyurethane material. However, in the present application, the low adhesion force can also be achieved for polyurethane materials while using no adhesion force reducing components such as plasticizers or minimizing the used amount. Therefore, in the present application, it is possible to provide a material that solves the problem of high adhesion force that is not required depending on the use while taking the advantages of the polyurethane material.

The resin composition or the cured body thereof may exhibit controlled adhesion force to aluminum. For example, the upper limit of the adhesion force to aluminum may be 1 $N/mm^2$, 0.9 $N/mm^2$, 0.8 $N/mm^2$, 0.7 $N/mm^2$, 0.6 $N/mm^2$, 0.5 $N/mm^2$, 0.4 $N/mm^2$, 0.3 $N/mm^2$, 0.2 $N/mm^2$, 0.1 $N/mm^2$, 0.09 $N/mm^2$, 0.08 $N/mm^2$, 0.07 $N/mm^2$, 0.06 $N/mm^2$, 0.04 $N/mm^2$ or 0.03 $N/mm^2$. The lower limit of the adhesion force to aluminum is not particularly limited. In one example, the lower limit of the adhesion force to aluminum may be 0 $N/mm^2$, 0.0001 $N/mm^2$, 0.0005 $N/mm^2$, 0.001 $N/mm^2$, 0.005 $N/mm^2$, 0.01 $N/mm^2$, 0.015 $N/mm^2$, 0.02 $N/mm^2$, 0.025 $N/mm^2$ or 0.03 $N/mm^2$ or so. That is, the resin composition may be a resin composition that the adhesion force to aluminum is not substantially measured, or may be a resin composition capable of forming a cured body that it is not substantially measured. The adhesion force to aluminum may be less than or equal to any one of the above-described upper limits, may be more than or equal to the above-described lower limits, or more than the lower limits, or may be less than or equal to the above-described upper limits while being more than or equal to the above-described lower limits, or more than the lower limits. The adhesion force to aluminum can be measured in the manner described in Examples of this specification.

The resin composition or the cured body thereof may exhibit controlled adhesion force to polyester. For example, the upper limit of the adhesion force to the polyester may also be 2,000 gf/10 mm, 1,800 gf/10 mm, 1,600 gf/10 mm, 1,400 gf/10 mm, 1,200 gf/10 mm, 1,000 gf/10 mm, 950 gf/10 mm, 900 gf/10 mm, 850 gf/10 mm, 800 gf/10 mm, 750 gf/10 mm, 700 gf/10 mm, 650 gf/10 mm, 600 gf/10 mm, 550 gf/10 mm, 500 gf/10 mm, 450 gf/10 mm, 400 gf/10 mm, 350 gf/10 mm, 300 gf/10 mm, 250 gf/10 mm, 200 gf/10 mm, 150 gf/10 mm, 100 gf/10 mm, 90 gf/10 mm, 80 gf/10 mm, 70 gf/10 mm, 60 gf/10 mm, 50 gf/10 mm, 40 gf/10 mm, 30 gf/10 mm, 20 gf/10 mm or 10 gf/10 mm. In the present application, the lower limit of the adhesion force to polyester is not particularly limited. In one example, the lower limit of the adhesion force to polyester may be 0 gf/10 mm. That is, the resin composition or the cured body thereof may not substantially exhibit adhesion force to polyester. Therefore, the adhesion force to polyester of the resin composition or the cured body thereof may be 0 gf/10 mm or more. For example, the lower limit of the adhesion force to polyester may also be 0 gf/10 mm, 5 gf/10 mm. 10 gf/10 mm, 15 gf/10 mm, 20 gf/10 mm, 25 gf/10 mm, 30 gf/10 mm, 35 gf/10 mm, 40 gf/10 mm, 45 gf/10 mm, 50 gf/10 mm, 55 gf/10 mm, 60 gf/10 mm, 65 gf/10 mm, 70 gf/10 mm, 75 gf/10 mm, 80 gf/10 mm, 85 gf/10 mm, 90 gf/10 mm or 95 gf/10 mm. The adhesion force to polyester may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits. The adhesion force to polyester can be measured in the manner described in Examples of this specification.

The resin composition or the cured body thereof may exhibit excellent thermal conductivity while exhibiting the adhesion force with respect to a specific adherend (e.g., aluminum and/or polyester). For example, the lower limit of the thermal conductivity of the resin composition or the cured body thereof may also be 1.2 W/mK, 1.4 W/mK. 1.6 W/mK. 1.8 W/mK, 2.0 W/mK. 2.2 W/mK. 2.4 W/mK, 2.6 W/mK or 2.8 W/mK or so. The upper limit of the thermal conductivity is not particularly limited. For example, the upper limit of the thermal conductivity of the resin composition or the cured body thereof may also be 10 W/mK, 9 W/mK, 8 W/mK, 7 W/mK, 6 W/mK, 5 W/mK, 4 W/mK or 3 W/mK or so. The thermal conductivity may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits. The thermal conductivity of such a resin composition or a cured body thereof can be measured by the method disclosed in Examples to be described below.

The resin composition or the cured body thereof may exhibit appropriate hardness. For example, if the hardness of the resin composition or the cured body thereof is too high, there may be a problem due to excessive brittleness. In addition, through the adjustment of the hardness of the resin composition or the cured body thereof, it is possible to secure impact resistance and vibration resistance, and to secure the durability of the product, according to the application uses.

For example, the upper limit of the shore OO type hardness in the resin composition or the cured body thereof may be 150, 140, 130, 120, 110, 100, 95, 90, 80, 70, 60, 50 or 45, and the lower limit may be 0, 5, 10, 15, 20, 25, 30, 35, 40, 45, 50, 55, 60, 65, 70, 75, 80 or 85 or so. The shore OO type hardness may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits. The hardness of such a resin composition or the cured body thereof can be measured by the method disclosed in Examples to be described below.

The resin composition or the cured body thereof may also exhibit appropriate flexibility. For example, as the flexibility of the resin composition or the cured body thereof is adjusted to a desired level, the application uses may be greatly expanded. For example, the lower limit of the curvature radius of the resin composition or the cured body thereof may be 1, 2, 3, 4, 5, 6, 7, 8, 9, 10, 11 or 12 or so, and the upper limit may also be 20, 19, 18, 17, 16, 15, 14, 13, 12, 11, 10, 9, 8, 7, 6, 5 or 4. The curvature radius may be less than or equal to, or less than any one of the above-described upper limits, may be more than or equal to, or more than any one of the above-described lower limits, or may be within a range of less than or equal to any one of the above-described upper limits while being more than or equal to, or more than any one of the above-described lower limits. The curvature radius of such a resin composition or the cured body thereof can be measured by the method disclosed in Examples to be described below. In addition, unless otherwise specified, the unit of curvature radius in this specification is mm.

The resin composition of the present application may have insulation properties. That is, the resin composition may have insulation properties and/or form a cured body having insulation properties. For example, the resin composition or the cured body thereof may have a dielectric breakdown voltage of about 3 kV/mm or more, about 5 kV/mm or more, about 7 kV/mm or more, 10 kV/mm or more, 15 kV/mm or more, or 20 kV/mm or more as measured in accordance with ASTM D149. The higher the value of the dielectric breakdown voltage, the better the insulation properties, and thus the upper limit is not particularly limited, but considering the composition or the like of the resin composition, the dielectric breakdown voltage may be about 50 kV/mm or less, 45 kV/mm or less, 40 kV/mm or less, 35 kV/mm or less, or 30 kV/mm or less or so. Such a dielectric breakdown voltage can be controlled by adjusting the insulation properties of the resin composition, which can be achieved, for example, by applying an insulating filler in the resin layer. In general, among fillers, a ceramic filler is known as a component capable of securing insulation properties.

The resin composition or the cured body thereof may have flame retardancy. For example, the resin composition or the cured body thereof may exhibit Grade V-0 in the UL 94 V Test (Vertical Burning Test). Accordingly, it is possible to secure stability against fires and other accidents that are of concern depending on the application uses of the resin composition.

The resin composition or the cured body thereof may have a specific gravity of 5 or less. In another example, the specific gravity may be 4.5 or less, 4 or less, 3.5 or less, or 3 or less. A resin layer exhibiting a specific gravity within such a range is advantageous for providing a more lightweight product. The lower limit of the specific gravity is not particularly limited. For example, the specific gravity may be about 1.5 or more or 2 or more. In order that the resin composition or the cured body thereof exhibits the specific gravity, components added to the resin layer may be adjusted. For example, when adding a filler, a filler capable of securing a desired characteristic (e.g., thermal conductivity) even at a low specific gravity as much as possible, that is, a method of applying a filler with a low specific gravity by itself or applying a surface-treated filler, and the like may be used.

The resin composition may have a low shrinkage rate during or after curing. Through this, it is possible to prevent peeling or void generation, and the like that may occur during the application process. The shrinkage rate may be appropriately adjusted within a range capable of exhibiting the above-described effect, which may be, for example, less than 5%, less than 3%, or less than about 1%. Since the shrinkage rate is more advantageous as the value is lower, the lower limit is not particularly limited.

The resin composition or the cured body thereof may have a low coefficient of thermal expansion (CTE). Through this, it is possible to prevent peeling or void generation, and the like that may occur during application or use processes. The coefficient of thermal expansion may be appropriately adjusted within a range capable of exhibiting the above-described effect, which may be, for example, less than 300 ppm/K, less than 250 ppm/K, less than 200 ppm/K, less than 150 ppm/K, or less than about 100 ppm/K. Since the lower the value of the coefficient of thermal expansion, the better, the lower limit is not particularly limited.

In the resin composition or the cured body thereof, a 5% weight loss temperature in a thermogravimetric analysis (TGA) may be 400° C. or more, or an 800° C. remaining amount may be 70 weight % or more. The stability at a high temperatures may be further improved by such a property. In another example, the 800° C. remaining amount may be about 75 weight % or more, about 80 weight % or more, about 85 weight % or more, or about 90 weight % or more. In another example, the 800° C. remaining amount may be about 99 weight % or less. The thermogravimetric analysis (TGA) can be measured within the range of 25° C. to 800° C. at a heating rate of 20° C./min under a nitrogen ($N_2$) atmosphere of 60 $cm^3$/min. The thermogravimetric analysis (TGA) result can also be achieved through composition control of the resin composition. For example, the 800° C. remaining amount is usually influenced by the type or ratio of the filler contained in the resin composition, and when an excessive amount of filler is included, the remaining amount increases.

The resin composition of the present application may comprise a hydroxy functional component. The term hydroxy functional component may mean all compounds having a hydroxy group present in the resin composition. Therefore, when one compound having a hydroxy group is present in the resin composition, the compound becomes the hydroxy group-functional component, and when two or more compounds having a hydroxy group are present in the resin composition, a mixture of the two or more compounds becomes the hydroxy group-functional component.

The compound having a hydroxy group forming the hydroxy functional component may be exemplified by an oil-modified polyol compound, a general polyol compound, and an oil-modified alcohol compound, and the like, but is not limited thereto.

The hydroxy functional component may comprise a polyol compound. The term polyol compound means a compound containing two or more hydroxy groups. Such a polyol compound may also be called a polyfunctional polyol compound. Such a polyol compound may be a monomolecular, oligomeric, or polymeric compound. The lower limit of the number of hydroxy groups of the polyol compound may be 2 or 3 or so, and the upper limit may also be 10, 9, 8, 7, 6, 5, 4, 3 or 2 or so. The number of hydroxy groups in the polyol compound may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The number of hydroxy groups included in the polyol compound can usually be confirmed through $^1$H NMR, and the number of hydroxy groups can be confirmed based on peaks present in a region of 3 to 4 ppm in $^1$H NMR.

The polyol compound of the present application may be an oil-modified polyol compound. The term oil-modified polyol compound means a compound containing two or more hydroxy groups and containing at least one oil group at its terminal at the same time. The oil group may be a linear or branched hydrocarbon group with 3 or more carbon atoms. It can be usually confirmed $^1$H NMR whether the polyol compound contains the hydrocarbon group, which is the oil group, where the existence and number of the hydrocarbon groups can be confirmed based on the peaks present in the region of 4 to 5 ppm in 1H NMR. Such a polyol compound may be a monomolecular, oligomeric, or polymeric compound. As such an oil-modified polyol compound is applied to be formed as a polyurethane material, it is possible to secure low adhesion force to a specific material while using no adhesion force reducing component such as a plasticizer or minimizing the used amount.

The lower limit of the number of the linear or branched hydrocarbon group, which is the oil group, may be 3, 4, 5, 6, 7, 8, 9, 10, 11, 12, 13, 14, 15, 16 or 17, and the upper limit may also be 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 or so. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The linear or branched hydrocarbon group, which is the oil group, may or may not contain double bonds. In the case of including the double bonds, such double bonds may be conjugated double bonds or cis double bonds.

A specific type of the hydrocarbon group, which is the oil group, may be exemplified by an alkyl group, an alkenyl group, or an alkynyl group. In one example, the hydrocarbon group may be linked to the polyol compound via a carbonyl group or a carbonyloxy group, and in this case, the hydrocarbon group, which is the oil group, may be an alkylcarbonyl group, an alkenylcarbonyl group, an alkynylcarbonyl group, an alkylcarbonyloxy group, an alkenylcarbonyloxy group, or an alkynylcarbonyloxy group. Here, the lower limit of the number of carbon atoms in the alkyl group, alkenyl group or alkynyl group may be 3, 4, 5, 6, 7, 8, 9, 10, 11, 12, 13, 14, 15, 16 or 17 or so, and the upper limit may be 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 or so. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The alkyl group, alkenyl group, or alkynyl group may be linear or branched, and may be optionally substituted with one or more substituents. When the substituent is present, the type of the substituent is not particularly limited, and for example, a halogen atom such as fluorine may be exemplified as the substituent.

In one example, the hydrocarbon group may be included in a substituent of Formula 1 below.

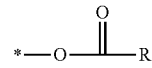

[Formula 1]

In Formula 1, R is a linear or branched hydrocarbon group with 3 or more carbon atoms. In Formula 1, the symbol * means that the relevant moiety is linked to the polyol compound. Thus, the oxygen atom in the substituent of Formula 1 may be linked to the polyol compound.

A specific type of the hydrocarbon group, which is R in Formula 1, is as described above. Therefore, the contents on the number of carbon atoms, type, form, and substituent of the above-described hydrocarbon groups may be applied in the same manner as above.

The number of hydrocarbon groups included in the polyol compound is not particularly limited, but in one example, the polyol compound may contain 1 or more, or 2 or more of hydrocarbon groups per molecule. The upper limit of the number of the hydrocarbon groups included in the polyol compound is not particularly limited, but for example, the number of the hydrocarbon groups may also be 10 or less, 9 or less, 8 or less, 7 or less, 6 or less, 5 or less, 4 or less, 3 or less, or 2 or less or so per molecule of the polyol compound.

The polyol compound may have various forms if it includes the hydroxy group and the hydrocarbon group.

In one example, the polyol compound may be a compound in the form that at least some of hydrogen atoms of a hydrocarbon compound such as an alkane, alkene or alkyne are substituted with the hydroxy groups and/or the hydrocarbon groups. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy groups and/or hydrocarbon groups in the alkane, alkene, or alkyne may be substituted on the same carbon atom, or may also be substituted on different carbon atoms.

In another example, the polyol compound may be a compound having a polyester backbone or a polyether backbone. In this case, the polyol compound may be an oligomeric compound or a polymeric compound.

In one example, the polyol compound having a polyester backbone is a so-called polyester polyol, and may be a polyol having a structure in which the hydrocarbon group is linked to such a polyester polyol.

In addition, the polyol compound having a polyether backbone is a so-called polyether polyol, and may be a polyol having a structure in which the hydrocarbon group is linked to such a polyether polyol.

In one example, the polyester backbone may be a so-called polycaprolactone backbone, and the polyether backbone may be a so-called polyalkylene backbone.

In one example, the polyester backbone may be a backbone having a repeating unit represented by Formula 2 below.

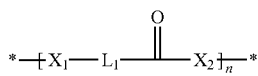

[Formula 2]

In Formula 2, $X_1$ and $X_2$ are each independently a single bond or an oxygen atom, $L_1$ may be an alkylene group, and n is an arbitrary number.

In the present application, the term single bond means a case where no atom exists at the relevant site.

In Formula 2, the alkylene group in Formula 2 may be an alkylene group having 1 to 20 carbon atoms, 4 to 20 carbon atoms, 4 to 16 carbon atoms, 4 to 12 carbon atoms, or 4 to 8 carbon atoms, which may be linear or branched.

In this specification, the term alkylene group means a divalent substituent formed by leaving two hydrogen atoms from an alkane, where the two hydrogen atoms may also be left from other carbon atoms of the alkane, and may also be left from one carbon atom of the alkane.

As described below, in one example, the polyester backbone may be a polycaprolactone backbone, where $L_1$ in Formula 2 above may be a linear alkylene group with 5 carbon atoms.

In Formula 2, n is an arbitrary number representing the number of repeating units, which may be, for example, a number within a range of 1 to 25.

The lower limit of n in Formula 2 may be 1, 3, 5, 7, 9, 11, 13, 15, 17, 19, 21 or 23 or so, and the upper limit may also be 25, 23, 21, 19, 17, 15, 13, 11, 9, 7, 5 or 3 or so. The n may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The backbone of Formula 2 is a backbone of a polyester polyol, which may be a so-called backbone of carboxylic acid polyol or backbone of caprolactone polyol. Such a backbone may be formed in a known manner, and for example, the backbone of the carboxylic acid polyol may be formed by reacting a component comprising a carboxylic acid and a polyol (e.g., diol or triol, etc.), and the backbone of the caprolactone polyol may be formed by reacting a component comprising a caprolactone and a polyol (e.g., diol or triol, etc.). The carboxylic acid may be a dicarboxylic acid.

In the polyol compound having the backbone of Formula 2, a hydroxy group or the above-described hydrocarbon group may be present at the terminal of the backbone of Formula 2 above.

In this case, the backbone of Formula 2 above may be represented by Formula 3 below.

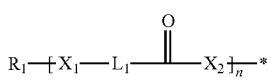

[Formula 3]

In Formula 3, $X_1$, $X_2$, $L_1$, and n are as defined in Formula 2, and $R_1$ may be a hydroxy group or a substituent of Formula 4 below.

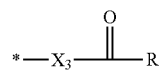

[Formula 4]

In Formula 4, $X_3$ is a single bond or an oxygen atom, and R is the same as R of Formula 1 above.

When $R_1$ in Formula 3 is a hydroxy group, $X_1$ may be a single bond, and when $R_1$ is a substituent of Formula 4 above, either one of $X_1$ or $X_3$ may be a single bond, and the other may be an oxygen atom.

The lower limit of the number of backbones of Formula 2 or 3 included in the polyol compound may be 1 or 2 or so, and the upper limit thereof may be 10, 9, 8, 7, 6, 5, 4, 3 or 2 or so. The number of backbones may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The polyol compound having a polyester backbone may have a linear or branched structure.

Here, the linear structure is a structure in which a main chain including a backbone of Formula 2 or 3 above is present and no other polymer chain is linked to the main chain, and the branched structure may be in a form that as a side chain, a chain including a backbone of Formula 2 or 3 above is bonded to the main chain including a backbone of Formula 2 or 3 above. Here, in the branched structure, the number of chains including the backbone of Formula 2 or 3 above linked as the side chain may be, for example, 1 to 5, 1 to 4, 1 to 3, 1 to 2, or 1.

In one example, the polyol compound having a polyester backbone may be a compound in the form that at least some of hydrogen atoms of a hydrocarbon compound such as an alkane, alkene or alkyne are substituted with the hydroxy group and/or the backbone of Formula 3 above. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy group and/or the backbone of Formula 3 may be substituted on the same carbon atom in the alkane, alkene, or alkyne, or may also be substituted on different carbon atoms.

In one example, the polyether backbone may be a backbone having a repeating unit of Formula 5 below.

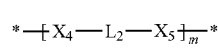

[Formula 5]

In Formula 5, $X_4$ and $X_5$ are each independently a single bond or an oxygen atom, $L_2$ may be an alkylene group, and m is an arbitrary number.

In Formula 5, the alkylene group may be, in one example, an alkylene group having 1 to 20 carbon atoms, 1 to 16 carbon atoms, 1 to 12 carbon atoms, 1 to 8 carbon atoms, or 1 to 4 carbon atoms, which may be linear or branched.

In Formula 5, m is an arbitrary number representing the number of repeating units, which may be, for example, a number within the range of 1 to 25.

The lower limit of m in Formula 5 may be 1, 3, 5, 7, 9, 11, 13, 15, 17, 19, 21 or 23 or so, and the upper limit may be 25, 23, 21, 19, 17, 15, 13, 11, 9, 7, 5 or 3 or so. The m may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

In the polyol compound having a backbone of Formula 5, the hydroxy group or the above-described hydrocarbon group may be present at the terminal of the backbone of Formula 5 above.

In this case, the backbone of Formula 5 above may be represented by Formula 6 below.

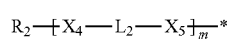

[Formula 6]

In Formula 6, $X_4$, $X_5$, $L_2$ and m are as defined in Formula 5, and $R_2$ may be a hydroxy group or a substituent of Formula 7 below.

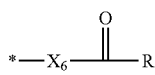

[Formula 7]

In Formula 7, $X_6$ is a single bond or an oxygen atom, and R is the same as R in Formula 1 above.

When $R_2$ in Formula 6 is a hydroxy group, $X_4$ is a single bond, and when $R_2$ is a substituent of Formula 7, either one of $X_4$ or $X_6$ is a single bond, and the other is an oxygen atom.

The lower limit of the number of backbones of Formula 5 or 6 above included in the polyol compound may be 1 or 2 or so, and the upper limit thereof may be 10, 9, 8, 7, 6, 5, 4, 3 or 2 or so. The number of backbones may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The polyol compound having a polyether backbone may have a linear or branched structure.

Here, the linear structure may be a structure in which a main chain including a backbone of Formula 5 or 6 above is present and no other polymer chain is linked to the main chain, and the branched structure may be in a form that as a side chain, a chain including a backbone of Formula 5 or 6 above is bonded to a main chain including a backbone of Formula 5 or 6 above. Here, in the branched structure, the number of chains containing the backbone of Formula 5 or 6 above linked as side chains may be, for example, 1 to 5, 1 to 4, 1 to 3, 1 to 2, or 1.

In one example, the polyol compound having the polyether backbone may be a compound in the form that at least some of hydrogen atoms of a hydrocarbon compound such as an alkane, alkene or alkyne are substituted with a hydroxy group and/or a backbone of Formula 5 above. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy group and/or the backbone of Formula 5 may be substituted on the same carbon atom in the alkane, alkene, or alkyne, or may also be substituted on different carbon atoms.

When the above-described polyol compound is an oligomeric or polymeric compound, the relevant compound may have an appropriate level of molecular weight.

For example, the lower limit of the weight average molecular weight of the oligomeric or polymeric polyol compound may be 100 g/mol, 200 g/mol. 300 g/mol, 400 g/mol, 500 g/mol, 600 g/mol, 700 g/mol, 800 g/mol or 900 g/mol or so, and the upper limit may also be 5000 g/mol, 4500 g/mol, 4000 g/mol, 3500 g/mol, 3000 g/mol, 2500 g/mol, 2000 g/mol, 1500 g/mol, 1000 g/mol or 800 g/mol or so. The weight average molecular weight may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

By applying the oil-modified polyol as described above, it is possible to more effectively secure desired physical properties.

The oil-modified polyol compound may be present in an appropriate ratio in the resin composition. For example, the lower limit of the content of the oil-modified polyol compound in the resin composition may be 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight % or 95 weight % or so, and the upper limit thereof may be 100 weight %, 95 weight %, 90 weight %, 85 weight %, 80 weight %, 75 weight %, 70 weight %, 65 weight %, 60 weight %, 55 weight %, 50 weight %, 45 weight %, 40 weight %, 35 weight %, 30 weight %, 25 weight % or 20 weight % or so. The content may be less than or equal to, or less than any one of the above-described upper limits, may be more than or equal to, or more than any one of the above-described lower limits, or may be within a range of less than or equal to, or less than any one of the upper limits while being more than or equal to, or more than any one of the above-described lower limits.

When the resin composition is a one-component type, the content of the oil-modified polyol compound is the content in the relevant one-component resin composition, and when it is a two-component composition, it is the content in the part where the oil-modified polyol compound is present. For example, when the two-component resin composition comprises a main part and a curing agent part that are physically separated, and the oil-modified polyol compound is included in the main part, the content of the oil-modified polyol may be a content based on the total weight of the main part. In addition, when the resin composition comprises a solvent and/or a filler, the content is a content based on weight excluding the contents of the solvent and filler.

In another example, when the resin composition comprises a filler component to be described below, the lower limit of the content of the oil-modified polyol compound relative to 100 parts by weight of the filler component may be 1 part by weight, 3 parts by weight. 5 parts by weight, 7 parts by weight, 9 parts by weight, 11 parts by weight or 13 parts by weight or so, and the upper limit thereof may also be 40 parts by weight, 35 parts by weight, 30 parts by weight, 25 parts by weight, 20 parts by weight, 15 parts by weight, 10 parts by weight, 8 parts by weight, 6 parts by weight, 4 parts by weight or 3 parts by weight or so. The content may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

When the resin composition is a one-component type, the ratio to the filler component is the ratio relative to 100 parts by weight of the entire filler component included in the relevant resin composition, and in the case of a two-component type, it is the ratio relative to 100 parts by weight of the entire filler component present in the part (main part or curing agent part) where the oil-modified polyol is included.

The hydroxy functional component may also optionally comprise an alcohol compound as an additional component. The term alcohol compound means a compound containing one hydroxy group per molecule. Such an alcohol compound may be a monomolecular, oligomeric, or polymeric compound.

If the alcohol compound is used, as the alcohol compound, an oil-modified alcohol compound may also be used. The term oil-modified alcohol compound means a compound containing one hydroxy group per molecule and at the same time containing at least one linear or branched hydrocarbon group having 3 or more carbon atoms, which is the oil group, at its terminal. Here, the method for confirming the number of hydroxy groups and the number of hydrocarbon groups is the same as that of the polyol compound. Such an alcohol compound may be a monomolecular, oligomeric, or polymeric compound. As such an oil-modified alcohol compound is applied together with the above-described oil-modified polyol compound to be formed as a polyurethane material, it is possible to secure low adhesion force to a specific material while not using an adhesion force reducing component such as a plasticizer or minimizing the used amount.

The oil-modified alcohol compound may have a form similar to that of the oil-modified polyol compound, except that it contains one hydroxy group per molecule. Therefore, the description of the oil-modified polyol compound may be equally applied to the oil-modified alcohol compound, except for the number of the hydroxy groups.

Therefore, for example, the lower limit of the number of carbon atoms in the linear or branched hydrocarbon group present in the oil-modified alcohol compound may be 4, 5, 6, 7, 8, 9, 10, 11, 12, 13, 14, 15, 16, or 17 or so, and the upper limit thereof may also be 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 or so. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The linear or branched hydrocarbon group may or may not contain double bonds. In the case of including the double bonds, such double bonds may be conjugated double bonds or cis double bonds.

A specific type of the hydrocarbon group may be exemplified by an alkyl group, an alkenyl group, or an alkynyl group. In one example, the hydrocarbon group may be linked to the alcohol compound via a carbonyl group or a carbonyloxy group, and in this case, the hydrocarbon group may be an alkylcarbonyl group, an alkenylcarbonyl group, an alkynylcarbonyl group, an alkylcarbonyloxy group, an alkenylcarbonyloxy group, or an alkynylcarbonyloxy group. The lower limit of the number of carbon atoms in the alkyl group, alkenyl group or alkynyl group may be 3, 4, 5, 6, 7, 8, 9, 10, 11, 12, 13, 14, 15, 16, or 17 or so, and the upper limit thereof may be 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 or so. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The alkyl group, alkenyl group, or alkynyl group may be linear or branched, and may be optionally substituted with one or more substituents. When the substituent is present, the type of the substituent is not particularly limited, and for example, a halogen atom such as fluorine may be exemplified as the substituent.

In one example, the hydrocarbon of the oil-modified alcohol compound may also be included in the substituent of Formula 1 above. In this instance, the detailed matters of the substituent of Formula 1 are also the same as in the case of the oil-modified polyol compound.

The number of hydrocarbon groups included in the alcohol compound is not particularly limited, but in one example, the lower limit of the number of hydrocarbon groups included in the alcohol compound may be 1 or 2 or so per molecule, and the upper limit thereof may also be 10, 9, 8, 7, 6, 5, 4, 3 or 2 or so per molecule. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The alcohol compound may have various forms if it includes the hydroxy group and the hydrocarbon group.

In one example, the alcohol compound may be a compound in the form that at least some of hydrogen atoms of a hydrocarbon compound such as an alkane, alkene or alkyne are substituted with the hydroxy groups and/or the hydrocarbon groups. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy groups and/or hydrocarbon groups in the alkane, alkene, or alkyne may be substituted on the same carbon atom, or may also be substituted on different carbon atoms.

In another example, the alcohol compound may be a compound having a polyester backbone or a polyether backbone. In this case, the alcohol compound may be an oligomeric compound or a polymeric compound.

Like the case of the polyol compound, the polyester backbone may be a so-called polycaprolactone backbone, and the polyether backbone may be a so-called polyalkylene backbone.

In one example, the polyester backbone may be a backbone having a repeating unit represented by Formula 2 above. In this instance, the specific contents of the repeating unit of Formula 2 are the same as those of the polyol compound.

Therefore, even in the case of the oil-modified alcohol compound, the hydroxy group or the above-described hydrocarbon group in the alcohol compound having the backbone of Formula 2 above may be present at the terminal of the backbone of Formula 2 above, and in this case, the backbone of Formula 2 above may be represented by Formula 3 above. In this instance, the specific contents of the backbone of Formula 3 are the same as those of the polyol compound.

The lower limit of the number of backbones of Formula 2 or 3 above in the alcohol compound may be 1 or 2 on the premise that the compound contains one hydroxy group per molecule, and the upper limit thereof may be 10, 9, 8, 7, 6, 5, 4, 3 or 2 or so. The number of backbones may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The alcohol compound having the polyester backbone may also have a linear or branched structure.

Here, the linear structure is a structure in which a main chain including a backbone of Formula 2 or 3 above is present and no other polymer chain is linked to the main chain, and the branched structure may be in a form that as a side chain, a chain including a backbone of Formula 2 or 3 above is bonded to the main chain including a backbone of Formula 2 or 3 above. Here, in the branched structure, the number of chains including the backbone of Formula 2 or 3 above linked as the side chain may be, for example, 1 to 5, 1 to 4, 1 to 3, 1 to 2, or 1.

In one example, the alcohol compound having a polyester backbone may also be a compound in the form that at least some of hydrogen atoms of a hydrocarbon compound such as an alkane, alkene or alkyne are substituted with the hydroxy group and/or the backbone of Formula 3 above. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy group and/or the backbone of Formula 3 may be substituted on the same carbon atom in the alkane, alkene, or alkyne, or may also be substituted on different carbon atoms.

In one example, the polyether backbone of the alcohol compound may also be a backbone having a repeating unit represented by Formula 5 above. In this instance, the specific contents of Formula 5 are the same as those of the polyol compound.

Even in an alcohol compound having a backbone of Formula 5, the hydroxy group or the above-described hydrocarbon group may be present at the terminal of the backbone of Formula 5 above, which may be a backbone of Formula 6. In this instance, the specific contents of Formula 6 are the same as those of the polyol compound.

The lower limit of the number of backbones of Formula 5 or 6 above included in the alcohol compound may be about 1 or 2 or so on the premise that the alcohol compound has one hydroxy group per molecule, and the upper limit thereof may be 10, 9, 8, 7, 6, 5, 4, 3 or 2 or so. The number of backbones may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The alcohol compound having a polyether backbone may have a linear or branched structure.

Here, the linear structure may be a structure in which a main chain including a backbone of Formula 5 or 6 above is present and no other polymer chain is linked to the main chain, and the branched structure may be in a form that as a side chain, a chain including a backbone of Formula 5 or 6 above is bonded to a main chain including a backbone of Formula 5 or 6 above. Here, in the branched structure, the number of chains containing the backbone of Formula 5 or 6 above linked as side chains may be, for example, 1 to 5, 1 to 4, 1 to 3, 1 to 2, or 1.

In one example, the alcohol compound having the polyether backbone may be a compound in the form that at least some of hydrogen atoms of a hydrocarbon compound such as an alkane, alkene or alkyne are substituted with a hydroxy group and/or a backbone of Formula 5 above. The number of carbon atoms in the hydrocarbon compound such as the alkane, alkene or alkyne may be, for example, 1 to 20, 1 to 16, 1 to 8, or 4 to 6.

Such a hydrocarbon compound such as the alkane, alkene or alkyne may be linear, branched, or cyclic. In addition, the hydroxy group and/or the backbone of Formula 5 may be substituted on the same carbon atom in the alkane, alkene, or alkyne, or may also be substituted on different carbon atoms.

When the above-described alcohol compound is an oligomeric or polymeric compound, the relevant compound may have an appropriate level of molecular weight.

For example, the lower limit of the weight average molecular weight of the polyol compound, which is oligomeric or polymeric, may be 100 g/mol, 200 g/mol, 300 g/mol, 400 g/mol, 500 g/mol, 600 g/mol, 700 g/mol, 800 g/mol, or 900 g/mol or so, and the upper limit thereof may also be 5000 g/mol, 4500 g/mol, 4000 g/mol, 3500 g/mol, 3000 g/mol, 2500 g/mol, 2000 g/mol, 1500 g/mol, 1000 g/mol or 800 g/mol or so. The weight average molecular weight may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

By applying the oil-modified polyol as described above, it is possible to more effectively secure desired physical properties.

The lower limit of the content of the oil-modified alcohol compound relative to 100 parts by weight of the oil-modified polyol compound may be 10 parts by weight, 20 parts by weight, 30 parts by weight, 40 parts by weight, 50 parts by weight, 60 parts by weight, 70 parts by weight, 80 parts by weight, 90 parts by weight, 100 parts by weight, 110 parts by weight, 120 parts by weight, 130 parts by weight, 140 parts by weight, 150 parts by weight. 160 parts by weight, 170 parts by weight, 180 parts by weight, 190 parts by weight, 200 parts by weight, 210 parts by weight, 220 parts by weight, 230 parts by weight, 240 parts by weight, 250 parts by weight, 260 parts by weight, 270 parts by weight, 280 parts by weight, 290 parts by weight or 300 parts by weight or so, and the upper limit thereof may also be 1,000 parts by weight, 950 parts by weight, 900 parts by weight, 850 parts by weight, 800 parts by weight, 750 parts by weight, 700 parts by weight, 650 parts by weight, 600 parts by weight, 550 parts by weight, 500 parts by weight, 450 parts by weight, 400 parts by weight, 350 parts by weight. 300 parts by weight, 250 parts by weight, 200 parts by weight, 150 parts by weight, 100 parts by weight, 90 parts by weight, 80 parts by weight. 70 parts by weight or 60 parts by weight or so. The ratio may be less than or equal to, or less than any one of the above-described upper limits, may be more than or equal to, or more than any one of the above-described lower limits, or may be within a range of less than or equal to, or less than any one of the upper limits while being more than or equal to, or more than any one of the above-described lower limits.

The ratio may be changed in consideration of the overall composition or desired physical properties of the resin composition.

The oil-modified polyol compound or alcohol compound may be synthesized through a known synthesis method. That is, the compounds may be prepared by reacting a compound capable of introducing the hydrocarbon group corresponding to the oil-modified portion with a known polyol compound. At this time, the compound capable of introducing the hydrocarbon group may be exemplified by saturated or unsaturated fatty acids, and specifically, may be exemplified by butyric acid, caproic acid, 2-ethylhexanoic acid, caprylic acid, isononanoic acid, capric acid, lauric acid, myristic acid, palmitic acid, stearic acid, linoleic acid, or oleic acid, and the like, but is not limited thereto.

In addition, the type of polyol compound reacting with the saturated or unsaturated fatty acid is not particularly limited, and for example, an appropriate type of general polyol compounds to be described below may be applied, but is not limited thereto.

The hydroxy functional component may further comprise a polyol compound different from the oil-modified polyol compound as the polyol compound. In this case, the polyol compound does not contain the hydrocarbon group, which is the above-described oil group, that is, the linear or branched hydrocarbon group having 3 or more carbon atoms. For convenience, such a polyol compound may be referred to as a general polyol compound in this specification.

The lower limit of the number of carbon atoms in the hydrocarbon group that the general polyol compound does not contain may be 4, 5, 6, 7, 8, 9, 10, 11, 12, 13, 14, 15, 16, or 17 or so, and the upper limit thereof may be 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10 or so. The number of carbon atoms may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits. In one example, the hydrocarbon group may be an alkyl group, an alkenyl group, or an alkynyl group having the number of carbon atoms.

The general polyol compound may contain two or more hydroxy groups per molecule, and such a polyol compound may be a monomolecular, oligomeric, or polymeric compound. The number of hydroxy groups included in the general polyol compound is not particularly limited, but in one example, the lower limit of the number of hydroxy groups included in the general polyol compound may be 2 or 3 or so per molecule, and the lower limit thereof may also be 10, 9, 8, 7, 6, 5, 4, 3 or 2 or so per molecule. The number of hydroxy groups may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The general polyol compound may have various forms.

In one example, the general polyol compound may be a polyester polyol. As the polyester polyol, for example, a so-called carboxylic acid polyol or caprolactone polyol may be used.

In one example, the polyester polyol may be a backbone having a repeating unit represented by Formula 8 below.

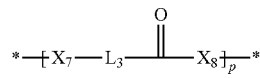

[Formula 8]

In Formula 8, $X_7$ and $X_8$ are each independently a single bond or an oxygen atom, $L_3$ may be an alkylene group, and p is an arbitrary number.

In Formula 8 above, the alkylene group may be, in one example, an alkylene group having 1 to 20 carbon atoms, 4 to 20 carbon atoms, 4 to 16 carbon atoms, 4 to 12 carbon atoms, or 4 to 8 carbon atoms, which may be linear or branched.

When the polyester polyol is a polycaprolactone polyol, $L_3$ of Formula 8 above may be a linear alkylene group with 5 carbon atoms.

Also, in Formula 8 above, p is an arbitrary number representing the number of repeating units, which may be, for example, a number within the range of 1 to 25.

The lower limit of p in Formula 8 above may be 1, 3, 5, 7, 9, 11, 13, 15, 17, 19, 21 or 23 or so, and the upper limit thereof may also be 25, 23, 21, 19, 17, 15, 13, 11, 9, 7, 5 or 3 or so. The p may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The polyester polyol having the backbone of Formula 8 above may be a so-called carboxylic acid polyol or caprolactone polyol. Such a polyol compound may be formed by a known method, and for example, the carboxylic acid polyol may be formed by reacting a component including a carboxylic acid and a polyol (e.g., diol or triol, etc.), and the caprolactone polyol may be formed by reacting a component including caprolactone and a polyol (e.g., diol or triol, etc.). The carboxylic acid may be a dicarboxylic acid.

In the polyol compound having the backbone of Formula 8 above, the hydroxy group may be present at the terminal of the backbone of Formula 8 above or at another site of the polyester polyol.

The lower limit of the number of backbones of Formula 8 above included in the general polyol compound may be 1 or 2, and the upper limit thereof may be 10, 9, 8, 7, 6, 5, 4, 3, 2 or 1 or so. The number of backbones may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The polyol compound having a polyester backbone may have a linear or branched structure.

Here, the linear structure may be a structure in which a main chain including the backbone of Formula 8 above is present and no other polymer chain is linked to the main chain, and the branched structure may be in a form that as side chains, chains including the backbone of Formula 8 above are bonded to a main chain including the backbone of Formula 8 above. In the branched structure, the number of chains containing the backbone of Formula 8 above linked as the side chains may be, for example, 1 to 5, 1 to 4, 1 to 3, 1 to 2, or 1.

In another example, a polyol having an alkane diol unit, a polyol unit, and a dicarboxylic acid unit may also be used as the general polyol compound. Such a polyol may be a mixture of the above alkane diol, polyol and dicarboxylic acid, or a reactant thereof. At this time, the alkane diol may be exemplified by a diol compound with 1 to 20 carbon atoms, 4 to 20 carbon atoms, 4 to 16 carbon atoms, or 4 to 12 carbon atoms, such as 3-methyl-1,5-pentanediol, 1,9-nonanediol or 1,6-hexanediol. In addition, the polyol may be exemplified by an alkane with 1 to 20 carbon atoms, 4 to 20 carbon atoms, 4 to 16 carbon atoms or 4 to 12 carbon atoms substituted with 3 to 10, 3 to 9, 3 to 8, 3 to 7, 3 to 6, 3 to 5, or 3 to 4 hydroxy groups, such as trimethylolpropane. In addition, the dicarboxylic acid may be exemplified by adipic acid, terephthalic acid, isophthalic acid, or sebacic acid, and the like. The polyol compound of this kind is known as, for example, product names of Kuraray's P-510, P-1010. P-2010, P-3010, P-4010, P-5010, P-6010, F-510, F-1010, F-2010, F-3010, P-2011, P-520, P-2020, P-1012, P-2012, P-630, P-2030, P-2050, or N-2010, and the like.

As the general polyol, a polyol having a weight average molecular weight in a range of 100 g/mol to 5,000 g/mol may be used. The desired effect can be more effectively achieved through the application of such a polyol.

When the general polyol compound is included, the lower limit of the weight ratio of the general polyol compound relative to 100 parts by weight of the oil-modified polyol compound may be 1 part by weight, 3 parts by weight, 5 parts by weight, 7 parts by weight, 10 parts by weight. 15 parts by weight, 20 parts by weight, 25 parts by weight, 30 parts by weight. 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight or 100 parts by weight or so, and the upper limit thereof may also be 200 parts by weight, 190 parts by weight, 180 parts by weight. 170 parts by weight, 160 parts by weight, 150 parts by weight, 140 parts by weight, 130 parts by weight, 120 parts by weight, 110 parts by weight, 100 parts by weight, 90 parts by weight. 80 parts by weight, 70 parts by weight, 60 parts by weight, 50 parts by weight, 40 parts by weight, 30 parts by weight, 20 parts by weight or 10 parts by weight or so. The ratio may be less than or equal to, or less than any one of the above-described upper limits, may be more than or equal to, or more than any one of the above-described lower limits, or may be within a range of less than or equal to, or less than any one of the upper limits while being more than or equal to, or more than any one of the above-described lower limits.

In another example, when the general polyol compound is included, the lower limit of the content ratio of the general polyol compound relative to 100 parts by weight of the sum of the oil-modified polyol and the oil-modified alcohol may be 1 part by weight, 5 parts by weight, 10 parts by weight, 15 parts by weight, 20 parts by weight, 25 parts by weight, 30 parts by weight, 35 parts by weight or 40 parts by weight or so, and the upper limit thereof may also be 200 parts by weight, 190 parts by weight, 180 parts by weight, 170 parts by weight, 160 parts by weight, 150 parts by weight, 140 parts by weight, 130 parts by weight, 120 parts by weight, 110 parts by weight, 100 parts by weight, 90 parts by weight, 80 parts by weight, 70 parts by weight, 60 parts by weight, 50 parts by weight, 40 parts by weight, 30 parts by weight, 20 parts by weight or 10 parts by weight or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The ratio may be changed in consideration of the composition or intended use of the entire resin composition.

The resin composition may comprise, as an additional component, a curing agent that reacts with the polyol compound and/or alcohol compound.

As the curing agent, various types may be applied, but when the resin composition is the polyurethane composition, a polyisocyanate may be applied as the curing agent. The term polyisocyanate means a compound having two or more isocyanate groups. The lower limit of the number of isocyanate groups in the polyisocyanate may be 2 or 3 or so, and the upper limit thereof may be 10, 9, 8, 7, 6, 5, 4, 3 or 2 or so. The number of the isocyanate groups may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The type of polyisocyanate used as the curing agent is not particularly limited, but a non-aromatic polyisocyanate containing no aromatic group may be used to secure desired physical properties.

As the polyisocyanate compound, for example, aliphatic polyisocyanates such as hexamethylene diisocyanate, trimethylhexamethylene diisocyanate, lysine diisocyanate, norbornane diisocyanate methyl, ethylene diisocyanate, propylene diisocyanate, or tetramethylene diisocyanate; alicyclic polyisocyanates such as transcyclohexane-1,4-diisocyanate, isophorone diisocyanate, bis(isocyanatemethyl)cyclohexane diisocyanate, or dicyclohexylmethane diisocyanate; or one or more carbodiimide-modified polyisocyanates or isocyanurate-modified polyisocyanates of the foregoing, and the like may be used. In addition, as the polyisocyanate, addition reaction products of the diisocyanate and polyol (for example, trimethylol propane, etc.) as described above may also be used. Furthermore, a mixture of two or more of the above-listed compounds may be used.

The application rate of the polyisocyanate may be adjusted in consideration of the number of hydroxy groups present in the hydroxy functional component included in the resin composition, and physical properties after curing.

For example, the polyisocyanate may be included in the resin composition so that an equivalent ratio (OH/NCO) of the number (OH) of hydroxy groups present in the hydroxy functional component present in the resin composition to the number (NCO) of isocyanate groups present in the polyisocyanate may be within a range of 50 to 1,000.

A method for calculating the equivalence ratio (OH/NCO) is known.

For example, if the resin composition is a two-component type, the hydroxy functional component is included in the main part, and the polyisocyanate is included in the curing agent part, the equivalent ratio OH/NCO can be calculated according to the following general equation 1.

[General Equation 1]

Equivalent Ratio (OH/NCO) =

$$\frac{D_1 \times \sum \{W_1 \times OH\ \%\}}{D_2 \times \sum \{W_2 \times NCO\ \%\}} \times \frac{DN}{DO}$$

In General Equation 1, $D_1$ is the density of the main part, $D_2$ is the density of the curing agent part, $W_1$ is the weight ratio of the polyol compound or alcohol compound present in the main part, OH % is the ratio of hydroxy groups included in the polyol compound or alcohol compound having the weight ratio of $W_1$, $W_2$ is the weight ratio of polyisocyanate present in the curing agent part, NCO % is the ratio of isocyanate groups included in the polyisocyanate having the weight ratio of $W_2$, DN is 42 Da as the dalton mass of the isocyanate group, and DO is 17 Da as the dalton mass of the hydroxy group.

The $W_1$ is the weight % (based on the total weight of the main part) in the main part of each polyol compound or alcohol compound present in the main part, and OH % of the relevant compound is the % of the hydroxy group included in 1 mole of each polyol compound or alcohol compound, which is obtained by dividing the product of the molar number of hydroxy groups included in a single polyol compound or alcohol compound and the molar mass of the hydroxy group by the molar mass of the single polyol compound or alcohol compound and then multiplying by 100.

Here, $W_2$ is the weight % (based on the total weight of the curing agent part) in the curing agent part of each polyisocyanate present in the curing agent part, and NCO % of the relevant compound is the % of the NCO group included in 1 mole of each polyisocyanate compound, which is obtained by dividing the product of the molar number of NCO groups included in a single polyisocyanate compound and the molar mass of the NCO group by the molar mass of the single polyisocyanate compound and then multiplying by 100.

Also, in General Equation 1 above, the dalton mass is a constant.

The lower limit of the equivalent ratio (OH/NCO) may be 50, 60, 70, 80, 90, 100, 110, 120, 130, 140, 150, 160, 170, 180, 190, 200, 210, 220, 230, 240, 250 or 260 or so, and the upper limit thereof may also be 1000, 900, 800, 700, 600, 500, 400, 300, 290, 280, 270, 260, 250, 240, 230, 220, 210, 200, 190, 180, 170, 160, 150, 140, 130, 120, 110 or 100 or so. The equivalent ratio may be less than or equal to, or less than any one of the above-described upper limits, or may be more than or equal to, or more than any one of the above-described lower limits, or may be within a range of less than or equal to, or less than any one of the above-described upper limits while being more than or equal to, or more than any one of the above-described lower limits.

The resin composition may further comprise a filler component. The term filler component means a component composed of a filler, that is, a component comprising only a filler.

In one example, the filler component may comprise two or more fillers having different average particle diameters. In one example, the filler component may comprise three or more fillers having different average particle diameters, or may be composed of three to six, three to five, three to four, or three fillers, having different average particle diameters. That is, in one example, the filler component may also comprise only three to six, three to five, three to four, or three fillers, having different average particle diameters.

In another example, the filler component may exhibit at least two peaks in a volume curve of a particle size distribution measured using laser diffraction. In one example, the filler component may exhibit three or more peaks in the volume curve of the particle size distribution, or may exhibit three to six, three to five, three to four, or three peaks. For example, in the range of the filler component exhibiting three peaks, the filler component exhibiting one, two, or four or more peaks is not included.

The average particle diameter in the filler of the present application means a particle diameter at which the volume accumulation becomes 50% in the volume curve of the particle size distribution measured by laser diffraction, which may also be referred to as a median diameter. That is, in the present application, the particle size distribution is obtained on a volume basis through the laser diffraction, and the particle diameter at the point where the cumulative value becomes 50% in the cumulative curve with 100% of the total volume is set as the average particle diameter, and in another example, such an average particle diameter may be referred to as a median particle size or a D50 particle diameter.

Therefore, here, the two fillers having different average particle diameters may mean fillers having different particle diameters at the point where the cumulative value becomes 50% in the volume curve of the particle size distribution.

When two or more fillers having different average particle diameters are usually mixed in order to form a filler component, as many peaks as the types of mixed fillers appear on the volume curve of the particle size distribution measured using laser diffraction with respect to the filler component. Therefore, for example, when three fillers having different average particle diameters are mixed to constitute a filler component, the volume curve of the particle size distribution measured using the laser diffraction regarding the filler component shows three peaks.

The filler component of the resin composition of the present application may be a thermally conductive filler component. The term thermally conductive filler component means a filler component functioning so that the resin composition or the cured body thereof exhibits the above-described thermal conductivity.

In one example, the filler component may comprise at least a first filler having an average particle diameter of 60 μm to 200 μm, a second filler having an average particle diameter in a range of 10 μm to 30 μm, and a third filler having an average particle diameter of 5 μm or less.

The lower limit of the average particle diameter of the first filler may be 62 μm, 64 μm, 66 μm or 68 μm or so, and the upper limit thereof may be 200 μm, 195 μm, 190 μm, 185 μm. 180 μm, 175 μm, 170 μm, 165 μm, 160 μm, 155 μm, 150 μm, 145 μm, 140 μm, 135 μm, 130 μm, 125 μm, about 120 μm, 115 μm, 110 μm, 105 μm, 100 μm, 95 μm, 90 μm, 85 μm, 80 μm or about 75 μm or so. The average particle diameter of the first filler may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The lower limit of the average particle diameter of the second filler may be 10 µm, 12 µm, 13 µm, 14 µm, 15 µm, 16 µm, 17 µm, 18 µm, 19 µm, or 20 µm or so, and the upper limit thereof may be 29 µm, 28 µm, 27 µm, 26 µm, 25 µm, 24 µm, 23 µm, 22 µm, 21 µm or about 20 µm or so. The average particle diameter of the second filler may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The lower limit of the third filler may be 0.01 µm. 0.1 µm, about 0.5 µm, 1 µm, 1.5 µm, or 2 µm or so, and the upper limit thereof may also be 5 µm, 4.5 µm, about 4 µm, 3.5 µm, 3 µm, 2.5 µm or 2 µm or so. The average particle diameter of the third filler may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The ratio (D1/D3) of the average particle diameter (D1) of the first filler to the average particle diameter (D3) of the third filler in the filler component may be in a range of 25 to 300.

In one example, the third filler may be a filler having the smallest average particle diameter among fillers included in the filler component when the filler component comprises two or more fillers having different average particle diameters, and the first filler may be a filler having the largest average particle diameter among fillers included in the filler component when the filler component comprises two or more fillers having different average particle diameters. In such a state, the particle diameter ratio may be satisfied.

The lower limit of the ratio (D1/D3) may be 25, 26, 27, 28, 29, 30, 31, 32, 33, 34, 35, 40, 50, 60, 70, 80, 90, 100, 110, 120, 130, 140, 150, 160, 170, 180, 190, 200, 210, 220, 230 or 235 or so, and the upper limit thereof may be 300, 290, 280, 270, 260, 250, 240, 220, 200, 180, 160, 140, 120, 100, 95, 90, 85, 80, 75, 70, 65 or 60 or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

In the filler component, the lower limit of the ratio (D1/D2) of the average particle diameter (D1) of the first filler to the average particle diameter (D2) of the second filler may be 3, 3.1, 3.2, 3.3, 3.4, or 3.5 or so, or may also be 20, 18, 17, 16, 15, 14, 13, 12, 11, 10, 9, 8, 7, 6, 5 or 4 or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

As the filler, for example, a ceramic material such as aluminum oxide (alumina: $Al_2O_3$), aluminum nitride (AlN), boron nitride (BN), silicon nitride ($Si_3N_4$), silicon carbide (SiC), beryllium oxide (BeO), zinc oxide (ZnO), magnesium oxide (MgO), aluminum hydroxide ($Al(OH)_3$), magnesium hydroxide ($Mg(OH)_2$), calcium carbonate ($CaCO_3$), calcium hydroxide ($Ca(OH)_2$), hydromagnesite and/or boehmite may be used. Such a filler is advantageous in satisfying the thermal conductivity within the above-mentioned range, and additionally, the above-described insulation properties and the like may also be satisfied through the application of a ceramic filler.

The upper limit of the proportion of the filler component in the resin composition may be 99 weight %, 98 weight %, 97 weight %, 96 weight %, 95 weight %, 94.5 weight %, 94 weight %, 93.5 weight %, 93 weight %, 92.5 weight %, 92 weight %, 91.5 weight %, 91 weight %, 90.5 weight %, 90.0 weight %, 89.5 weight %, 89.0 weight %, 88.5 weight % or 88.0 weight % or so, and the lower limit thereof may be about 70 weight %, 71 weight %, 72 weight %, 73 weight %, 74 weight %, about 75 weight %, 76 weight %, 77 weight %, 78 weight %, 79 weight %, 80 weight %, 81 weight %, 82 weight %, 83 weight %, 84 weight %, 85 weight %, 86 weight %, 87 weight % or 88 weight % or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

When the resin composition is a one-component resin composition, the content of the filler component may be a ratio based on the total weight of the relevant resin composition, and in the case of a two-component resin composition, it may be a ratio based on the combined weight of the main part and the curing agent part of the two-component resin composition, or may be a ratio based on the total weight of the main part or the curing agent part alone.

When the resin composition is composed of the two-component resin composition, it may be appropriate that the filler component to be applied to the final cured body as the filler component is divided in substantially equal amounts and introduced into the main and curing agent parts, respectively.

The filler component may comprise various types of fillers, if necessary, in addition to the thermally conductive filler, and for example, a carbon filler such as graphite, fumed silica, or clay, and the like may be applied.

The resin composition may further comprise necessary components in addition to the above-described components.

In one example, the resin composition may further comprise a plasticizer. As described above, in the present application, it is possible to secure low adhesion force to a specific material without applying a plasticizer, but a small amount of plasticizer may also be applied if necessary.

The type of the applicable plasticizer is not particularly limited, and for example, a phthalate-based plasticizer such as dioctyl phthalate (DOP), dibutyl phthalate (DBP), butylbenzyl phthalate (BBP), diisononyl phthalate (DINP) or polyethylene terephthalate (PET), an adipate-based plasticizer such as dioctyl adipate (DOA) or diisononyl adipate (DINA), a fatty acid-based plasticizer, a phosphoric acid-based plasticizer, or a polyester-based plasticizer, and the like may be applied.

When the plasticizer is included, the ratio may be adjusted according to the purpose. For example, when the plasticizer is included, the lower limit of the weight ratio of the plasticizer relative to 100 parts by weight of the oil-modified polyol compound may be 0.5 parts by weight, 1.5 parts by weight, 2 parts by weight, 3 parts by weight, 4 parts by weight, 5 parts by weight, 6 parts by weight, 7 parts by weight, 8 parts by weight, 9 parts by weight, 10 parts by weight. 15 parts by weight, 20 parts by weight, 25 parts by weight, 30 parts by weight, 35 parts by weight, 40 parts by weight, 45 parts by weight, 50 parts by weight, 100 parts by weight, 150 parts by weight, 200 parts by weight, 250 parts by weight or 300 parts by weight or so, and the upper limit thereof may also be 500 parts by weight, 450 parts by weight, 400 parts by weight, 350 parts by weight, 300 parts by weight, 250 parts by weight, 200 parts by weight, 150 parts by weight. 100 parts by weight, 90 parts by weight, 80 parts by weight, 70 parts by weight, 60 parts by weight, 50 parts by weight, 40 parts by weight, 30 parts by weight, 20 parts by weight, 19 parts by weight, 18 parts by weight, 17 parts by weight, 16 parts by weight, 15 parts by weight. 14 parts by weight, 13 parts by weight, 12 parts by weight, 11 parts by weight, 10 parts by weight, 9 parts by weight. 8 parts by weight. 7 parts by weight, 6 parts by weight. 5 parts by weight, 4 parts by weight, 3 parts by weight. 2 parts by weight or 1 part by weight or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

In another example, when the plasticizer is included, the lower limit of the ratio of the plasticizer relative to 100 parts by weight of the sum (oil-modified component) of the oil-modified polyol and the oil-modified alcohol may be 0.5 parts by weight, 1.5 parts by weight, 2 parts by weight, 5 parts by weight, 10 parts by weight, 15 parts by weight, 20 parts by weight, 25 parts by weight, 30 parts by weight, 50 parts by weight, 60 parts by weight, 70 parts by weight, 80 parts by weight, 90 parts by weight, 100 parts by weight, 110 parts by weight, 120 parts by weight, 130 parts by weight or 140 parts by weight or so, and the upper limit thereof may also be 400 parts by weight, 350 parts by weight, 300 parts by weight, 250 parts by weight, 200 parts by weight, 150 parts by weight, 100 parts by weight, 90 parts by weight, 80 parts by weight, 70 parts by weight, 60 parts by weight, 50 parts by weight, 40 parts by weight, 30 parts by weight, 20 parts by weight, 19 parts by weight, 18 parts by weight, 17 parts by weight, 16 parts by weight. 15 parts by weight, 14 parts by weight, 13 parts by weight, 12 parts by weight, 11 parts by weight, 10 parts by weight. 9 parts by weight. 8 parts by weight, 7 parts by weight, 6 parts by weight, 5 parts by weight, 4 parts by weight. 3 parts by weight, 2 parts by weight or 1 part by weight or so. The ratio may be less than or equal to, or less than any one of the above-described upper limits, may be more than or equal to, or more than any one of the above-described lower limits, or may be within a range of less than or equal to, or less than any one of the above-described upper limits while being more than or equal to, or more than any one of the above-described lower limits.

The ratio may also be changed in consideration of the composition or intended use of the entire resin composition.

In addition to the above components, the resin composition may comprise additional components as needed. It may further comprise, as an example of additional components, a catalyst that assists or accelerates the curing reaction, a viscosity modifier (e.g., thixotropy imparting agent, diluent, etc.) for increasing or decreasing the viscosity, or for adjusting the viscosity according to shear force, a dispersing agent, a surface treatment agent, or a coupling agent, and the like.

The resin composition may further include a flame retardant or a flame-retardant adjuvant. In this case, a known flame retardant may be used without special limitation, and for example, a solid filler type flame retardant or a liquid flame retardant may be applied.

The flame retardant includes, for example, an organic flame retardant such as melamine cyanurate or an inorganic flame retardant such as magnesium hydroxide, and the like. When the amount of filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame-retardant synergist may also be added.

As described above, the resin composition may be the one-component composition or the two-component composition. In the case of the two-component composition, the above-described respective components of the resin composition may be separately included in the main part and the curing agent part which are physically separated.

In one example, the present application relates to a composition (two-component composition) in which the resin composition is composed of a two-component resin composition.

Such a two-component composition may comprise at least a main part and a curing agent part, where the main and curing agent parts may be physically separated from each other. When the main and curing agent parts thus physically separated are mixed, a curing reaction may be initiated, and as a result, polyurethane may be formed.

In the two-component composition, the main part may comprise at least the oil-modified polyol compound among the hydroxy functional component, and the curing agent part may comprise at least the polyisocyanate.

When the oil-modified alcohol compound and/or general polyol compound as described above is included in the resin composition, this compound may be included, for example, in the main part.

In addition, the filler component may be included in any one of the main and curing agent parts, or may be included in both the main and curing agent parts. When the filler component is included in both the main and curing agent parts, the same amount of the filler component may be included in the main and curing agent parts.

The catalyst, plasticizer, flame retardants, and the like as other components may be included in the main and/or curing agent part as needed.

Furthermore, in the two-component composition, a volume ratio (P/N) of the volume (P) of the main part to the volume (N) of the curing agent part may be in a range of about 0.8 to 1.2.

Such a two-component composition or the cured body thereof may also exhibit the adhesion force to aluminum and polyester, thermal conductivity, hardness, curvature, insulation, flame retardancy, specific gravity, shrinkage, coefficient of thermal expansion and/or 5% weight loss temperature in a thermogravimetric analysis (TGA), and the like.

The present application also relates to a product comprising the resin composition or the cured body thereof. The resin composition of the present application or the cured body thereof may be usefully applied as a heat dissipation material. Therefore, the product may comprise a heat-generating component. The term heat-generating component means a component that emits heat during use, and the type is not particularly limited. The representative heat-generating component includes various electric/electronic products comprising battery cells, battery modules, or battery packs, and the like.

The product of the present application may comprise, for example, the heat-generating component and the resin composition (or the two-component composition) or the cured body thereof existing adjacent to the heat-generating component.

A specific method of configuring the product of the present application is not particularly limited, and if the resin composition or the two-component composition of the present application, or the cured body thereof is applied as a heat dissipation material, the product may be configured in various known ways.

Advantageous Effects

In the present application, it is possible to provide a resin composition or a cured body thereof that exhibits low adhesion force to a predetermined adherend while exhibiting high thermal conductivity. Also, in the present application, the low adhesion force can be achieved without using an adhesion force adjusting component such as a plasticizer or in a state where the use ratio thereof is minimized. The present application can also provide a product comprising the curable composition or the cured body thereof.

DESCRIPTION OF DRAWINGS

FIGS. 1 and 2 are analysis results for hydroxy functional components synthesized in Preparation Examples 1 and 2.

DETAILED DESCRIPTION

Hereinafter, the present application will be specifically described through Examples, but the scope of the present application is not limited by the following examples.

The cured body mentioned below is formed by mixing main and curing agent parts of all resin compositions in Examples, which are prepared in a two-component type, so that the OH/NCO equivalent ratio described in each example is satisfied, and then maintaining the mixture at room temperature for about 24 hours.

1. Thermal Conductivity

The thermal conductivity of the resin composition (curable composition) or the cured body thereof was measured by a hot-disk method according to ISO 22007-2 standard. Specifically, mixtures of the main parts and the curing agent parts in a volume ratio of 1:1 in Examples or Comparative Examples composed of a two-component type were each placed in a mold having a thickness of about 7 mm or so, and the thermal conductivity was measured in the through plane direction using the Hot Disk equipment. As stipulated in the above standard (ISO 22007-2), the Hot Disk equipment is an equipment that can check the thermal conductivity by measuring the temperature change (electrical resistance change) while the sensor with the nickel wire double spiral structure is heated, and the thermal conductivity was measured according to this standard.

2. Measurement of Adhesion Force to Polyester

The adhesion force to polyester was evaluated for a specimen prepared by attaching a PET (polyethylene terephthalate) film and an aluminum plate. A film having a width of 10 mm or so and a length of 200 mm or so was used as the PET film, and an aluminum plate having each of a width and a length of 100 mm was used as the aluminum plate. A resin composition was applied to the entire surface of the aluminum plate and maintained at room temperature (about 25° C.) for about 24 hours in a state where the PET film was attached on the resin composition to prepare a specimen. At this time, the entire width and 100 mm or so of the length portion in the PET film were attached to the aluminum plate via the resin composition. The adhesion force was measured while the PET film was peeled from the aluminum plate in the longitudinal direction in a state where the aluminum plate of the specimen was fixed. The attachment was performed by applying the resin composition (the mixture of the main part and the curing agent part in a volume ratio of 1:1) to the aluminum plate to have a thickness of about 2 mm or so after curing, and then closely attaching the PET film on the layer of the resin composition, and maintaining them at room temperature (about 25° C.) for about 24 hours to cure the resin composition. The peeling was performed at a peel rate of about 0.5 mm/min or so and a peel angle of 180 degrees until the PET film was completely peeled off.

3. Measurement of Adhesion Force to Aluminum

An uncured resin composition (a mixture of a main part and a curing agent part) was coated in the center of an aluminum substrate having horizontal and vertical lengths of 2 cm and 7 cm, respectively, to have a width of 2 cm and a length of 2 cm or so, and an aluminum substrate having horizontal and vertical lengths of 2 cm and 7 cm, respectively, was attached again on the coating layer, and the resin composition was cured by maintaining the state. Here, the two aluminum substrates were attached to form an angle of 90 degrees to each other. Hereinafter, with the upper aluminum substrate fixed, the lower aluminum substrate was pressed at a speed of 0.5 mm/min to measure the force while the lower aluminum substrate was separated, and the adhesion force to aluminum was obtained by dividing the maximum force measured in the process by the area of the specimen.

4. Hardness Measurement

The hardness of the cured body of the resin composition was measured according to ASTM D 2240 and JIS K 6253 standards. It was performed using ASKER's durometer hardness device, where the initial hardness was measured by applying a load of 1 Kg or more (about 1.5 Kg) to the surface of the sample (resin layer) in a flat state, and after 15 seconds, the hardness was evaluated by confirming the stabilized measurement value.

5. Measurement of Curvature Radius

The curvature radius of the cured body was evaluated using a cured body having a width, a length, and a thickness of 1 cm, 10 cm, and 2 mm, respectively. When the cured body is attached to cylinders having various radii and bent along the longitudinal direction, the curvature radius is the minimum radius of the cylinder at which cracks do not occur in the cured body.

6. Measurement of Weight Average Molecular Weight

The weight average molecular weight (Mw) was measured using GPC (Gel permeation chromatography). Specifically, the weight average molecular weight (Mw) can be measured by adding a sample to be analyzed into a 5 mL vial, diluting it with a THF (tetrahydrofuran) solvent to a concentration of about 1 mg/mL, and then filtering a standard sample for calibration and the analysis sample through a syringe filter (pore size: 0.45 μm). Agilent technologies' ChemStation is used as an analysis program, and the weight average molecular weight (Mw) can be obtained by comparing the elution time of the sample with the calibration curve.

<GPC Measurement Conditions>
    Instrument: Agilent technologies' 1200 series
    Column: using Agilent technologies' TL Mix. A & B
    Solvent: THF (tetrahydrofuran)
    Column temperature: 35° C.
    Sample concentration: 1 mg/mL, 200 μl injection Standard samples: using polystyrene (MP: 3900000, 723000, 316500, 52200, 31400, 7200, 3940, 485)

Preparation Example 1

A hydroxy functional component (A) consisting of an oil-modified polyol compound of the following formula A was prepared in the following manner.

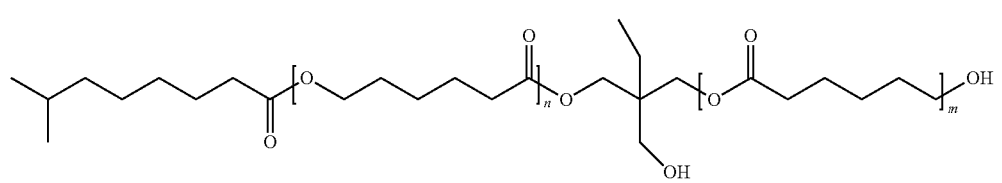

[Formula A]

In Formula A, n and m are each more than 0, and their sum is about 4.8.

Polycaprolactone polyol (Perstorp Capa 3031) and isononanoic acid as a saturated fatty acid were mixed in a weight ratio of 1:0.53 (Capa 3031: isononanoic acid). Subsequently, a catalyst (Tin (II) 2-ethylhexanoate (Sigma-Aldrich)) was added in an amount of 0.1 parts by weight relative to 100 parts by weight of the mixture, and maintained while stirring at 150° C. for 30 minutes under an inert gas purge condition. Subsequently, a small amount of xylene as an azeotropic solution was introduced thereto, the temperature was raised to 200° C., and the mixture was reacted for 3 hours or more, and then the pressure was reduced to 80 Torr or less, and the xylene and unreacted materials were removed. The reactant was filtered after cooling to obtain a target product (compound of Formula A).

As a result of GPC analysis performed on the target product, the weight average molecular weight was about 876 g/mol. FIG. 1 is a view showing the results of GPC analysis performed on the target product.

Preparation Example 2

A hydroxy functional component (B) consisting of an oil-modified polyol compound represented by the following formula B was prepared in the following manner.

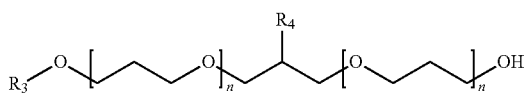

[Formula B]

In Formula B, each n is about 4, $R_4$ is a substituent of Formula B-1 below, and $R_3$ is a substituent of Formula B-2 below.

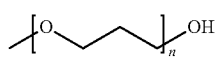

[B-1]

In Formula B-1, n is about 4.

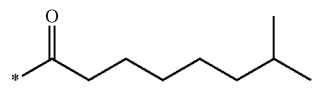

[B-2]

A compound of Formula C below (PPG, manufacturer: Perstorp, product name: Polyol3380) and isononanoic acid as a saturated fatty acid were mixed in a flask at a weight ratio of 1:0.38 (compound of Formula C: isononanoic acid).

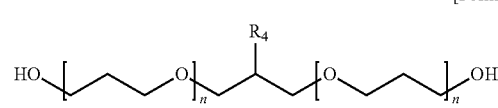

[Formula C]

In Formula C, each n is about 4, and $R_4$ is a substituent represented by Formula C-1 below.

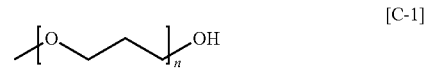

[C-1]

In Formula C-1, n is about 4.

A catalyst (Tin (II) 2-ethylhexanoate (Sigma-Aldrich)) was added to the mixture in an amount of 0.3 parts by weight relative to 100 parts by weight of the total mixture, and stirred at 150° C. for 30 minutes under an inert gas purge condition. Subsequently, a small amount of xylene as an azeotropic solution was added thereto, the temperature was raised to 190° C., and the mixture was reacted for 10 hours or more, and the pressure was reduced to 40 Torr or less for 1 hour or more to remove xylene and unreacted materials. The reactant was cooled and filtered through a filter to obtain a target product.

As a result of GPC analysis performed on the target product, the weight average molecular weight was about 800 g/mol. FIG. 2 is a view showing the results of GPC analysis performed on the target product.

Example 1

Preparation of Main Part

The main part was prepared by mixing the hydroxy functional component (B) of Preparation Example 2, a filler component and a plasticizer (diisononyl adipate) in a weight ratio of 10:89:1 (component (B):filler component:plasticizer). Here, the filler component was prepared by mixing a first alumina filler having an average particle diameter of about 70 µm, a second alumina filler having an average particle diameter of about 20 µm, and a third alumina filler having an average particle diameter of about 1 µm. The weight ratio during the mixing was about 6:2:2 (first alumina filler:second alumina filler:third alumina filler).

Preparation of Curing Agent Part

A polyisocyanate (Tolonate HDT-LV2, manufactured by Vencorex) was used as a curing agent. The curing agent part was prepared by mixing the polyisocyanate, filler component, and plasticizer (diisononyl adipate) in a weight ratio of 5:5:90 (polyisocyanate:filler component:plasticizer). Here, as the filler component, the same filler component as the filler component of the main part was used.

Preparation of Resin Composition and Cured Body

A resin composition (curable composition) was prepared by preparing the main part and the curing agent part, respectively, and the main and curing agent parts were mixed, and then maintained at room temperature to form a cured body. Here, the mixing was made so that the equivalent ratio (OH/NCO) of the hydroxy group (OH) present in the main part and the isocyanate group (NCO) present in the curing agent part was about 100.

Example 2

A resin composition (curable composition) was prepared by preparing the main part and the curing agent part in the same manner, respectively, as in Example 1, and the main part and the curing agent part were mixed, and then maintained at room temperature to form a cured body, but the mixing was made so that the equivalent ratio (OH/NCO) of the hydroxy group (OH) present in the main part and the isocyanate group (NCO) present in the curing agent part was about 170.

Example 3

Preparation of Main Part

The main part was prepared by mixing the hydroxy functional component (A) of Preparation Example 1, a filler component and a plasticizer (diisononyl adipate) in a weight ratio of 9.7:89:1.3 (component (A):filler component:plasticizer). Here, as the filler component, the same filler component as in Example 1 was used.

Preparation of Curing Agent Part

A polyisocyanate (Vencorex, Tolonate HDT-LV2) was used as a curing agent. The curing agent part was prepared by mixing the polyisocyanate, filler component, and plasticizer (diisononyl adipate) in a weight ratio of 5:5:90 (polyisocyanate:filler component:plasticizer). Here, as the filler component, the same filler component as in Example 1 was used.

Preparation of Resin Composition

A resin composition (curable composition) was prepared by preparing the main part and the curing agent part, respectively, and the main and curing agent parts were mixed, and then maintained at room temperature to form a cured body. Here, the mixing was made so that the equivalent ratio (OH/NCO) of the hydroxy group (OH) present in the main part and the isocyanate group (NCO) present in the curing agent part was about 100.

Example 4

A resin composition (curable composition) was prepared by preparing the main part and the curing agent part in the same manner, respectively, as in Example 3, and the main part and the curing agent part were mixed, and then maintained at room temperature to form a cured body, but the mixing was made so that the equivalent ratio (OH/NCO) of the hydroxy group (OH) present in the main part and the isocyanate group (NCO) present in the curing agent part was about 170.

Example 5

Preparation of Main Part

The main part was prepared by mixing the hydroxy functional component (A) of Preparation Example 1, a general polyol compound (Kuraray, F-2010), a filler component and a plasticizer (diisononyl adipate) in a weight ratio of 11.4:1.1:87:0.5 (component (A):general polyol compound:filler component:plasticizer). Here, as the filler component, the same filler component as in Example 1 was used.

Preparation of Curing Agent Part

A polyisocyanate (Vencorex, Tolonate HDT-LV2) was used as a curing agent. The curing agent part was prepared by mixing the polyisocyanate, filler component, and plasticizer (diisononyl adipate) in a weight ratio of 5:5:90 (polyisocyanate:filler component:plasticizer). Here, as the filler component, the same filler component as in Example 1 was used.

Preparation of Resin Composition

A resin composition (curable composition) was prepared by preparing the main part and the curing agent part, respectively, and the main and curing agent parts were mixed, and then maintained at room temperature to form a cured body. Here, the mixing was made so that the equivalent ratio (OH/NCO) of the hydroxy group (OH) present in the main part and the isocyanate group (NCO) present in the curing agent part was about 179.

Example 6

A resin composition (curable composition) was prepared by preparing the main part and the curing agent part in the same manner, respectively, as in Example 5, and the main part and the curing agent part were mixed, and then maintained at room temperature to form a cured body, but the mixing was made so that the equivalent ratio (OH/NCO) of the hydroxy group (OH) present in the main part and the isocyanate group (NCO) present in the curing agent part was about 157.

Example 7

A resin composition (curable composition) was prepared by preparing the main part and the curing agent part in the same manner, respectively, as in Example 5, and the main part and the curing agent part were mixed, and then maintained at room temperature to form a cured body, but the mixing was made so that the equivalent ratio (OH/NCO) of the hydroxy group (OH) present in the main part and the isocyanate group (NCO) present in the curing agent part was about 140.

Example 8

Preparation of Main Part

The main part was prepared by mixing the hydroxy functional component (A) of Preparation Example 1, a general polyol compound (Kuraray, F-2010), a filler component and a plasticizer (diisononyl adipate) in a weight ratio of 7.4:3.2:87:2.4 (component (A):general polyol:filler component:plasticizer). Here, as the filler component, the same filler component as in Example 1 was used.

Preparation of Curing Agent Part

A polyisocyanate (Vencorex, Tolonate HDT-LV2) was used as a curing agent. The curing agent part was prepared by mixing the polyisocyanate, filler component, and plasticizer (diisononyl adipate) in a weight ratio of 5:5:90 (polyisocyanate:filler component:plasticizer). Here, as the filler component, the same filler component as in Example 1 was used.

Preparation of Resin Composition

A resin composition (curable composition) was prepared by preparing the main part and the curing agent part, respectively, and the main and curing agent parts were mixed, and then maintained at room temperature to form a cured body. Here, the mixing was made so that the equivalent ratio (OH/NCO) of the hydroxy group (OH) present in the main part and the isocyanate group (NCO) present in the curing agent part was about 170.

Example 9

A resin composition (curable composition) was prepared by preparing the main part and the curing agent part in the same manner, respectively, as in Example 8, and the main part and the curing agent part were mixed, and then maintained at room temperature to form a cured body, but the mixing was made so that the equivalent ratio (OH/NCO) of the hydroxy group (OH) present in the main part and the isocyanate group (NCO) present in the curing agent part was about 140.

The physical property evaluation results summarized for the respective examples are as shown in Table 1 below.

TABLE 1

| | Adhesion force to polyester (gf/cm) | Al adhesion force (N/mm²) | Shore OO hardness | Thermal conductivity (W/mK) | Curvature radius |
|---|---|---|---|---|---|
| Example 1 | 182 | 0.15 | 91 | 2.546 | 8 |
| Example 2 | 90 | 0.13 | 64 | 2.626 | 0 |
| Example 3 | 333 | 0.15 | 98 | 2.755 | >12 |
| Example 4 | 125 | 0.039 | 92 | 2.631 | 8 |
| Example 5 | 96 | 0.064 | 74 | 2.481 | 4 |
| Example 6 | 133 | 0.048 | 88 | 2.556 | 6 |
| Example 7 | 116 | 0.07 | 93 | 2.434 | 7 |
| Example 8 | 255 | 0.045 | 86 | 2.558 | 3 |
| Example 9 | 222 | 0.032 | 95 | 2.627 | 8 |

The invention claimed is:

1. A curable composition comprising a polyol compound and a filler,
wherein the polyol compound comprises at least one substituent of Formula 1 at its terminal:

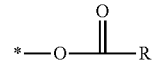

[Formula 1]

wherein in Formula 1, R is a branched alkyl group having 5 or more carbon atoms, a branched alkenyl group having 5 or more carbon atoms, or a branched alkynyl group having 5 or more carbon atoms.

2. The curable composition according to claim 1, forming a cured body having an adhesion force to aluminum of 0.1 N/mm² or less.

3. The curable composition according to claim 1, forming a cured body having an adhesion force to a polyester surface of 100 gf/cm or less.

4. The curable composition according to claim 1, forming a cured body having a shore OO hardness of 95 or less.

5. The curable composition according to claim 1, wherein the polyol compound has a polyester backbone or a polyether backbone.

6. The curable composition according to claim 1, wherein the polyol compound has a polycaprolactone backbone or a polyalkylene backbone.

7. The curable composition according to claim 1, wherein the polyol compound comprises a polyol compound having a weight average molecular weight in a range of 100 g/mol to 3000 g/mol.

8. The curable composition according to claim 1, further comprising a polyol compound having no branched hydrocarbon group having 5 or more carbon atoms.

9. The curable composition according to claim 8, wherein the polyol compound having no branched hydrocarbon group having 5 or more carbon atoms comprises a polycaprolactone polyol, or a polyol having an alkanediol unit, a polyol unit, and a dicarboxylic acid unit.

10. The curable composition according to claim 1, further comprising a polyisocyanate.

11. The curable composition according to claim 1, further comprising a plasticizer.

12. The curable composition according to claim 1, wherein the filler is aluminum hydroxide, magnesium hydroxide, calcium hydroxide, hydromagnesite, magnesia, alumina, aluminum nitride, boron nitride, silicon nitride, silicon carbide, zinc oxide or beryllium oxide.

13. A two-component composition comprising:
a main part comprising a polyol compound and a filler; and
a curing agent part comprising a curing agent component and a filler,
wherein the polyol compound comprises at least one substituent of Formula 1 at its terminal:

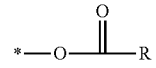

[Formula 1]

wherein in Formula 1, R is a branched alkyl group having 5 or more carbon atoms, a branched alkenyl group having 5 or more carbon atoms, or a branched alkynyl group having 5 or more carbon atoms.

14. A product comprising a heat-generating component, and a cured body of the curable composition of claim 1.

15. A product comprising a heat-generating component, and a cured body of the curable composition of the two-component composition of claim 13, which is present adjacent to the heat-generating component.

* * * * *